Patented Dec. 29, 1942

2,306,932

UNITED STATES PATENT OFFICE 2,306,932

MIXED ESTERS OF METHYLOL PHENOLS

Herman A. Bruson, Philadelphia, Pa., assignor to The Resinous Products & Chemical Company, Philadelphia, Pa.

No Drawing. Application May 9, 1940, Serial No. 334,170

12 Claims. (Cl. 260—469)

This invention relates to mixed esters of methylol phenols in which the acyloxy radical attached directly to the aromatic nucleus and the acyloxy radical attached to the methylene groups are derived from different carboxylic acids. It also relates to a process for preparing these mixed esters.

In copending application Serial No. 240,009 filed November 12, 1938, which on October 22, 1940, issued as U. S. Patent No. 2,218,739, it is shown that tertiary aminomethyl phenols may be esterified by treating them with an acyl chloride which may be derived from any mono- or poly-carboxylic acid.

In copending application Serial No. 272,804 filed May 10, 1939, it is shown that when a tertiary aminomethyl phenol is heated with the anhydride of a monobasic carboxylic acid the hydroxyl group of the phenol is esterified and simultaneously the tertiary amino group is replaced by the acyloxy radical of the acid anhydride. This may be exemplified by the following reaction:

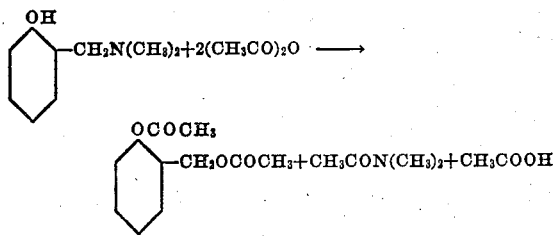

It has now been found that the esters of the tertiary aminomethyl phenols will react in a similar manner with anhydrides of carboxylic acids thus making available a process whereby mixed esters can be prepared in which the acyloxy groups attached directly to the aromatic nucleus are different from those attached to the methylene groups. The acyloxy group attached directly to the aromatic nucleus may be derived from any mono- or poly-carboxylic acid of the aliphatic, aromatic, arylaliphatic, cycloaliphatic or heterocyclic series and may be saturated or unsaturated. On the other hand, the acyloxy group which replaces the amino group of the tertiary aminomethyl phenol ester, when the latter is treated with an acid anhydride, must be derived from a monocarboxylic acid. When anhydrides of polycarboxylic acids react on the tertiary aminomethyl phenols or their esters, resinous products are obtained as is disclosed in copending application Serial No. 312,338 filed January 4, 1940. For practical purposes the anhydrides chosen for the present invention are preferably those of the lower monobasic aliphatic acids such as acetic, propionic, butyric, isobutyric, or crotonic anhydrides. However, any monocarboxylic acid anhydride may be used since the principle involved is the same. The higher acid anhydrides cause difficulty in purifying the product on account of the low volatility of the free acid and acid amide which result from the reaction.

The mixed esters obtained according to this invention are useful as plasticizers, high boiling solvents and as intermediates in the manufacture of synthetic resins, drying oils, etc. as is shown in copending applications Ser. Nos. 334,169, 334,171, and 334,172, all filed May 9, 1940.

The esters of the tertiary aminomethyl phenols which serve as the starting material may be prepared from any tertiary aminomethyl phenol obtained by condensing any monohydric or polyhydric monocyclic phenol or polycyclic phenol having a bridged or condensed ring system with one or more mols each of formaldehyde and a non-aromatic secondary amine. The number of mols of formaldehyde and secondary amine employed in this condensation will depend on the type of product desired and the number of reactive positions in the particular phenol employed.

The process is carried out in general by heating a mixture of the ester of a tertiary aminomethyl phenol and the acid anhydride to 100–200° C. In the case of the anhydrides which boil within this range it is most convenient to boil the mixture under a reflux condenser until the reaction is complete and then distill out the acid amide formed during the reaction.

The following examples will illustrate the invention.

Example 1

140 g. of benzoyl chloride was added gradually, while stirring, to a solution of 151 g. of 2-hydroxybenzyl-N-dimethylamine in 300 cc. of dry benzene. The mixture was stirred for two and one-half hours, then cooled to 5° C., and gradually neutralized with 10% sodium hydroxide solution, keeping the temperature below 20° C. during the neutralization. The benzene layer was separated, washed with water, dried, and the benzene removed by evaporation on a steam bath. The residual oil, consisting essentially of 2-(dimethylaminomethyl)-phenyl benzoate, was then acetylated as follows:

188 g. of this ester was boiled for 5 hours under reflux with 82 g. of acetic anhydride. The reaction product was then distilled in vacuo. The desired product came over between 150–180° C./1 mm., as a colorless oil. It boiled mostly at 160–165° C./1–2 mm. Analysis and saponification value agreed with the formula

Example 2

155 g. of α-ethylhexoyl chloride was added gradually, while stirring, to a solution of 207 g. of 2-(dimethylaminomethyl)-4-tertiary butylphenol in 300 c. of dry benzene. The resulting ester amine hydrochloride solution was cooled to 5° C. and made slightly alkaline with 10% sodium hydroxide solution at a temperature not exceeding 15° C. The benzene layer was separated, washed, dried, and evaporated in vacuo to give a pale yellow liquid consisting essentially of 2-(dimethylaminomethyl)-4-ter. butyl-phenyl-α-ethyl hexoate.

270 g. of this ester was boiled under reflux with 100 g. of acetic anhydride (90%) for 5 hours. The product was then distilled in vacuo, the fraction boiling at 165–180° C./1–2 mm. being collected. It consisted essentially of the mixed ester having the formula

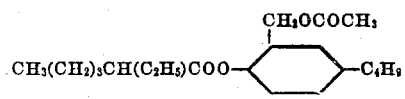

It is a colorless liquid.

Example 3

To a solution of 230 g. of 2-(dimethylaminomethyl)-4-ter. butylphenol in 600 cc. of dry benzene there was added drop-wise, while stirring and cooling, 120 g. of sebacyl chloride (ClCO—(CH₂)₈—COCl). The mixture was then stirred for two hours at 25–30° C. and finally cooled to 5° C. The cooled mixture was neutralized with 10% sodium hydroxide solution at 5–10° C. and the benzene layer separated, washed, and dried. Upon evaporation of the benzene, there was obtained a light brown oil, solidifying to a white solid on cooling, and consisting essentially of the base having the formula

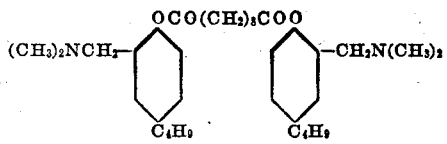

A mixture of 230 g. of the above base and 135 g. of acetic anhydride was heated under reflux at 140–150° C. for 5 hours. The product was then stripped of low boiling material by heating in vacuo (2 mm.) to 150° C. The residue was a pale yellow oil weighing 264 g. Its analysis indicated a 95% content of a product having the formula

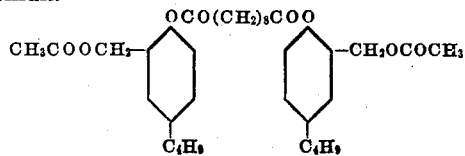

Example 4

(a) A mixture consisting of 165 g. of 2-dimethyl aminomethyl)-4-ter. butylphenyl oleate and 50 g. of acetic anhydride was heated for 5 hours at 140–150° C. under a reflux condenser. The product was heated in vacuo to 175° C. at 1 mm., to remove low boiling components. The residual product was an oil consisting essentially of 2-acetoxymethyl-4-ter. butylphenyl oleate;

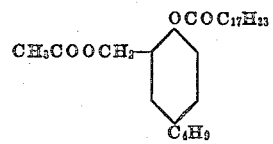

(b) When heated with acetic anhydride in the same manner, 2-dimethylaminomethyl)-4-ter. butylphenyl ester of linseed oil fatty acids (prepared from 2-(dimethylaminomethyl)-4-ter. butylphenol and the mixed acid chlorides of linseed oil fatty acids) gave a dark oil consisting essentially of the mixed linoleic and linolenic acid esters of 2-acetoxymethyl-4-ter. butylphenol.

Example 5

To a solution of 263 g. of 2-(dimethylaminomethyl)-4-ter.octylphenol in 800 cc. of benzene there was added gradually 78 g. of acetyl chloride while stirring and cooling to 10° C. In a short time the mixture solidified to a crystalline paste of the acetic acid ester hydrochloride which was filtered off, dissolved in water, and neutralized at 5° C. with a 10% solution of sodium hydroxide. The acetic acid ester of the free base having the formula

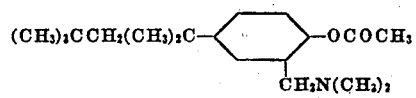

separated as an oil boiling at 153–155° C./2 mm.

A mixture consisting of 30 g. of the above ester and 18 g. of crotonic anhydride was heated for 5 hours at 150° C. The excess crotonic anhydride and the crotonic dimethyl amide formed were then distilled off under reduced pressure. The residual product was an oil consisting essentially of the mixed ester having the formula

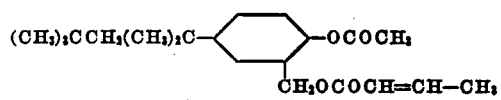

Example 6

A mixture of 46.7 g. of 1-(dimethylaminomethyl)-2-naphthyl stearate

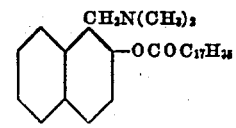

and 20 g. of butyric anhydride was heated for five hours at 150° C. Excess butyric anhydride and the butyric dimethyl amide formed were distilled off under reduced pressure. The residual product was an oil, consisting essentially of the mixed butyrate stearate of α-methylol-β-naphthol having the formula

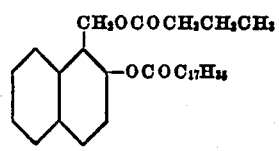

Example 7

A mixture consisting of 58.4 g. of di-(2-dimethylaminomethylxenyl)-phthalate

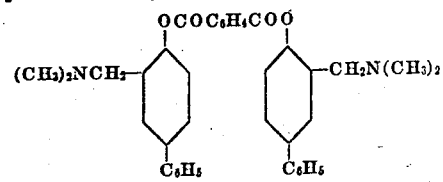

and 32 g. of propionic anhydride was heated for five hours at 145–155° C. The excess propionic anhydride and the propionic dimethyl amide formed were distilled off under reduced pressure, leaving a thick liquid consisting essentially of the mixed propionate-phthalate ester of methylol p-phenylphenol having the formula

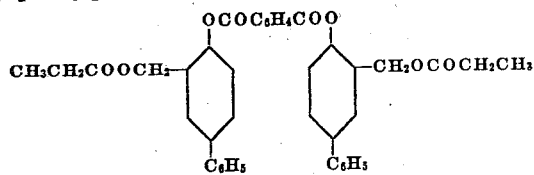

Example 8

One mol of adipyl chloride was added gradually to 2 mols of 2-(dimethylaminomethyl)-p-cresol dissolved in benzene. The product was then neutralized with 10% sodium hydroxide solution at 5–10° C. The resulting ester solution was washed and dried and the benzene evaporated off. The ester obtained corresponding to the formula

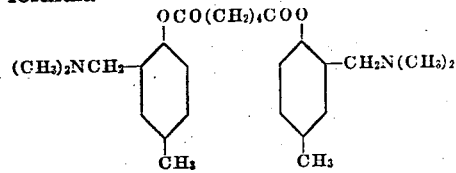

was then boiled with 2.5 mols of acetic anhydride at 140–145° C. for 6 hours. After distilling off acetic dimethylamide and excess acetic anhydride in vacuo, an excellent yield of a pale yellow oil was obtained consisting essentially of the mixed adipate-acetate, having the formula

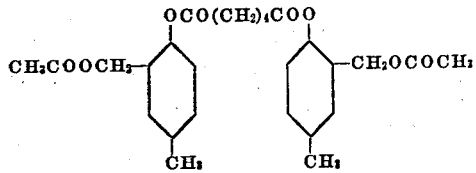

In a similar manner, the monocarboxylic or polycarboxylic acid esters of morpholinomethylphenols, piperindinomethyl phenols, or other tertiary aminomethyl phenols, cresols, xylenols, naphthols, hydroxydiphenyls, benzyl phenols, cyclohexyl phenols, and other hydroxyaromatic compounds may be condensed with monocarboxylic acid anhydrides to form mixed esters of methylol phenols.

I claim:

1. The process of preparing mixed esters of methylol phenols which comprises heating to reacting temperatures a mixture of an ester of a tertiary aminomethyl phenol and the anhydride of a monobasic carboxylic acid which is different from the acid corresponding to the acyl radical of the ester of the tertiary aminomethyl phenol.

2. The process of preparing mixed esters of methylol phenols which comprises heating to reacting temperatures a mixture of a dicarboxylic acid ester of a tertiary aminomethyl phenol and the anhydride of a monobasic carboxylic acid.

3. The process of preparing mixed esters of methylol phenols which comprises heating to reacting temperatures a mixture of an ester of a tertiary aminomethyl phenol and the anhydride of a monobasic lower aliphatic carboxylic acid which is different from the acid corresponding to the acyl radical of the ester of the tertiary aminoethyl phenol.

4. The process which comprises heating to reacting temperatures a mixture of di-(2-dimethylaminomethyl-4-methylphenyl)-adipate and acetic anhydride.

5. The process which comprises heating to reacting temperatures a mixture of di-(2-dimethylaminomethylxenyl)-phthalate and acetic anhydride.

6. The process which comprises heating to reacting temperatures a mixture of di-(2-dimethylaminomethyl-4-ter.butyl-phenyl)-sebacate and acetic anhydride.

7. Mixed esters of methylol phenols in which the methylol group is esterified with a monocarboxylic acid and the phenolic hydroxyl group is esterfied with a polycarboxylic acid.

8. Mixed esters of methylol phenols in which the methylol group is esterfied with a monocarboxylic acid and the phenolic hydroxyl group is esterfied with a dibasic carboxylic acid.

9. Mixed esters of methylol phenols in which the methylol group is esterified with a monocarboxylic lower aliphatic acid and the phenolic hydroxyl group is esterified with a polycarboxylic acid.

10. An ester having the formula

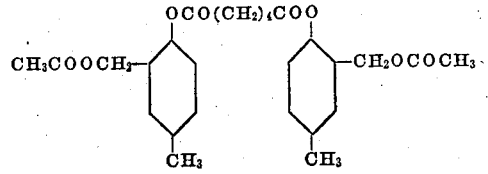

11. An ester having the formula

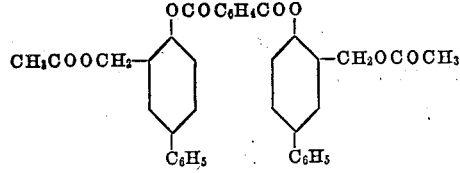

12. An ester having the formula

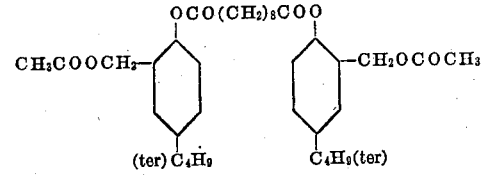

HERMAN A. BRUSON.